US011295020B2

(12) United States Patent
Kursun (10) Patent No.: US 11,295,020 B2
(45) Date of Patent: Apr. 5, 2022

(54) SYSTEM FOR INTEGRATED NATURAL LANGUAGE PROCESSING AND EVENT ANALYSIS FOR THREAT DETECTION IN COMPUTING SYSTEMS

(71) Applicant: Bank of America Corporation, Charlotte, NC (US)

(72) Inventor: Eren Kursun, New York, NY (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 358 days.

(21) Appl. No.: 16/531,603

(22) Filed: Aug. 5, 2019

(65) Prior Publication Data
US 2021/0042420 A1 Feb. 11, 2021

(51) Int. Cl.
*G06F 21/57* (2013.01)
*G06N 20/00* (2019.01)
*G06F 40/30* (2020.01)

(52) U.S. Cl.
CPC ............ *G06F 21/577* (2013.01); *G06F 40/30* (2020.01); *G06N 20/00* (2019.01)

(58) Field of Classification Search
CPC .............................. G06F 21/577; G06N 20/00
USPC ......................................................... 726/25
See application file for complete search history.

(56) References Cited

U.S. PATENT DOCUMENTS

| 8,078,551 | B2 | 12/2011 | Bar |
| 8,326,936 | B2 | 12/2012 | Marino et al. |
| 8,521,512 | B2 | 8/2013 | Gorman et al. |
| 8,887,286 | B2 | 11/2014 | Dupont et al. |
| 8,925,095 | B2 | 12/2014 | Herz et al. |
| 9,336,388 | B2 | 5/2016 | Brdiczka et al. |
| 9,552,417 | B2 | 1/2017 | Olligschlaeger et al. |
| 9,672,355 | B2 | 6/2017 | Titonis et al. |
| 9,906,554 | B2 | 2/2018 | Higbee et al. |
| 10,096,034 | B2 | 10/2018 | Kass et al. |
| 10,318,882 | B2 | 6/2019 | Brueckner et al. |
| 10,956,477 | B1* | 3/2021 | Fang ..................... G06F 21/563 |
| 2013/0097706 | A1* | 4/2013 | Titonis .................. G06F 21/566 726/24 |
| 2015/0067833 | A1 | 3/2015 | Verma et al. |
| 2015/0213358 | A1* | 7/2015 | Shelton ............... H04L 41/0604 706/47 |
| 2015/0379072 | A1 | 12/2015 | Dirac et al. |
| 2015/0379424 | A1 | 12/2015 | Dirac et al. |
| 2015/0379429 | A1 | 12/2015 | Lee et al. |
| 2016/0253679 | A1 | 9/2016 | Venkatraman et al. |

(Continued)

OTHER PUBLICATIONS

Bose et al., IEEE Systems Journal, vol. 11, No. 2, Jun. 2017, "Detecting Insider Threats Using RADISH: A System for Real-Time Anomaly Detection in Heterogeneous Data Streams", pp. 471-482 (Year: 2017).*

*Primary Examiner* — Khalil Naghdali
(74) *Attorney, Agent, or Firm* — Moore & Van Allen PLLC; Seongun M. Hong (57) ABSTRACT

A system for integrated natural language programming ("NLP") and event analysis provides threat detection in computing systems. In particular, the system may use an NLP unit to analyze threat logs from various sources according to multiple different metrics and/or analysis paradigms. Upon completing the analysis, the system may extract, via machine learning, event and/or threat patterns which may be integrated into the system's threat detection processes.

20 Claims, 2 Drawing Sheets

(56) References Cited

U.S. PATENT DOCUMENTS

| | | |
|---|---|---|
| 2016/0352772 A1 | 12/2016 | O'Connor |
| 2018/0359267 A1 | 12/2018 | Hovor et al. |
| 2020/0012789 A1 | 1/2020 | Usui et al. |
| 2020/0034742 A1 | 1/2020 | Dirac et al. |
| 2020/0057858 A1* | 2/2020 | Sharma .................. G06N 20/20 |
| 2020/0272741 A1* | 8/2020 | Bhatia ................ H04L 63/0263 |
| 2020/0349257 A1* | 11/2020 | Saffar .................... G06N 5/046 |
| 2021/0019674 A1* | 1/2021 | Crabtree ............ G06K 9/00718 |

* cited by examiner

FIG. 1

FIG. 2

SYSTEM FOR INTEGRATED NATURAL LANGUAGE PROCESSING AND EVENT ANALYSIS FOR THREAT DETECTION IN COMPUTING SYSTEMS

FIELD OF THE INVENTION

The present disclosure embraces a system for integrated natural language programming and event analysis for threat detection in computing systems. In particular, the system may use various learning models to provide threat analysis data to systems across multiple different channels.

BACKGROUND

Threat detection systems using conventional computing processes may face a number of technological challenges. Specifically, conventional threat detection systems may be functionally disconnected from threat log repositories. Accordingly, there is a need for a more efficient way to incorporate and integrate threat data.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a system for integrated natural language programming ("NLP") and event analysis for threat detection in computing systems. In particular, the system may use an NLP unit to analyze threat logs from various sources according to multiple different metrics and/or analysis paradigms. Upon completing the analysis, the system may extract, via machine learning, event and/or threat patterns which may be integrated into the system's threat detection processes.

Accordingly, embodiments of the present disclosure provide a system for threat detection using integrated natural language processing and event analysis. The system may comprise a memory device with executable code stored thereon; a communication device; a neural network device; and a processing device operatively coupled to the memory device and the communication device. The executable code may cause the processing device to access, using a natural language processing unit, a set of threat log data; perform a series of analyses on the set of threat log data, wherein the series of analyses comprises preprocessing, tokenization, syntactic analysis, and semantic analysis; based on the series of analyses, identify one or more events and one or more entities; identify, via machine learning, an event sequence from the one or more events and the one or more entities; and update, using the identified event sequence, one or more channel-specific threat detection models.

In some embodiments, the executable code further causes the processing device to extract, via unsupervised learning, common patterns from the set of threat log data by performing cluster analysis.

In some embodiments, the set of threat log data comprises voice recordings and written recordings, wherein the executable code further causes the processing device to analyze the voice recordings and the written recordings in parallel.

In some embodiments, the set of threat log data comprises threat analyst logs, client reports, or third party logs.

In some embodiments, the executable code further causes the processing device to store the event sequence within a repository of known and emerging patterns.

In some embodiments, the executable code further causes the processing device to update the one or more channel-specific threat detection models using the repository of known and emerging patterns.

In some embodiments, identifying the event sequence from the one or more events and the one or more entities comprises using supervised learning to extract a threat pattern from the set of threat log data and the repository of known and emerging patterns.

In some embodiments, the executable code further causes the processing device to update, using the extracted threat pattern, the one or more channel-specific threat detection models.

In some embodiments, updating the one or more channel-specific threat detection models comprises training and retraining the channel-specific threat detection models.

Embodiments of the present disclosure also provide a computer-implemented method for threat detection using integrated natural language processing and event analysis. The method may comprise accessing, using a natural language processing unit, a set of threat log data; performing a series of analyses on the set of threat log data, wherein the series of analyses comprises preprocessing, tokenization, syntactic analysis, and semantic analysis; based on the series of analyses, identifying one or more events and one or more entities; identifying, via machine learning, an event sequence from the one or more events and the one or more entities; and updating, using the identified event sequence, one or more channel-specific threat detection models.

In some embodiments, the method further comprises extracting, via unsupervised learning, common patterns from the set of threat log data by performing cluster analysis.

In some embodiments, the set of threat log data comprises voice recordings and written recordings, the method further comprising analyzing the voice recordings and the written recordings in parallel.

In some embodiments, the set of threat log data comprises threat analyst logs, client reports, or third party logs.

In some embodiments, the method further comprises storing the event sequence within a repository of known and emerging patterns.

In some embodiments, the method further comprises updating the one or more channel-specific threat detection models using the repository of known and emerging patterns.

In some embodiments, identifying the event sequence from the one or more events and the one or more entities comprises using supervised learning to extract a threat pattern from the set of threat log data and the repository of known and emerging patterns.

In some embodiments, the method further comprises updating, using the extracted threat pattern, the one or more channel-specific threat detection models.

In some embodiments, updating the one or more channel-specific threat detection models comprises training and retraining the channel-specific threat detection models. In some embodiments, the executable code further causes the processing device to merge the event sequence with one or more transactional and one or more non-transactional event sequences.

Embodiments of the present disclosure also provide an integrated natural language processing unit for threat detection using event analysis. The unit may comprise a memory device with executable code stored thereon; a communication device; a neural network device; and a processing device operatively coupled to the memory device and the communication device. The executable code may cause the processing device to access a set of threat log data; perform a series of analyses on the set of threat log data, wherein the series of analyses comprises preprocessing, tokenization, syntactic analysis, and semantic analysis; based on the series of analyses, identify one or more events and one or more entities; identify, via machine learning, an event sequence from the one or more events and the one or more entities; and update, using the identified event sequence, one or more channel-specific threat detection models.

In some embodiments, the executable code further causes the processing device to extract, via unsupervised learning, common patterns from the set of threat log data by performing cluster analysis.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Neural network" as referred to herein may refer to a device or network of computing devices or nodes that use machine learning algorithms to accomplish certain tasks. Broadly, neural networks may be used for tasks requiring pattern recognition. For instance, a neural network may be constructed and used for the purposes of speech recognition, facial recognition, fraud detection of unauthorized activity, machine translation, or the like.

"Node" or "neuron" as used herein may refer to a functional unit within the neural network which may receive inputs, perform calculations based on the inputs, and produce outputs based on the calculations. In some embodiments, each node may be configured to produce an output only when the aggregated weighted inputs exceeds a certain threshold. Nodes may be structured such that some of the nodes receive inputs and/or outputs from other nodes. Based on the inputs received, the calculations performed on the inputs may change over time. For instance, a set of nodes may change the weights or biases for certain inputs based on learning algorithms (e.g., machine learning). In some embodiments, nodes may be arranged into layers, where each "layer" of nodes is configured to accomplish a specific task within the overarching objective of the neural network. Typically, the neural network comprises an input layer, and output layer, and one or more hidden layers in between the input layer and output layer, such that a neural network receives one or more signals through the input layer, at which point the signals propagates through the various layers of the neural network before reaching the output layer. Accordingly, in some embodiments, a neural network may itself be considered to be a node.

"Resource" as used herein may refer to an object under the ownership of a user which is stored or maintained by the entity on the user's behalf. The resource may be intangible or tangible objects such as data files, documents, biographical data, funds, and the like. Typically, the user's account contains records of the resources owned by the user. Account data may be stored in an account database within the entity's systems.

Embodiments of the present disclosure provide a system for integrated natural language programming and event analysis for threat detection in computing systems. As used herein, "threat" may refer to an event or element which is likely to create a negative impact on the entity system. One example of a threat may be unauthorized access and/or use of the entity system and/or a user account (e.g., a data security issue). In this regard, the system may communicate with one or more threat log repositories to access the threat log data stored therein. The threat log repositories may contain such data as historical threat data, attack pattern data, threat event logs, or the like. Accordingly, in embodiments in which the threat is unauthorized user access, the threat log data may contain text-based data related to patterns and/or exploits used by unauthorized users, a record of successful and/or unsuccessful access attempts, notes logged by an entity agent or administrator, a record of client interactions (e.g., a phone call with a client regarding the client's compromised account), analyst comments, or the like.

Based on the threat log data, the system may perform various types of analyses to extract threat information from the threat log data. In particular, the system may use an NLP unit to perform parsing and preprocessing, tokenization, sentence splitting, and/or other syntactic analyses. The system may also perform semantic analysis, entity analysis (e.g., the parties involved in threat events), machine learning-based event pattern analysis, or the like. Once the threat information has been extracted, the system may update its processes to mitigate the threat.

An exemplary use case of the system is provided below. A potentially malicious user may attempt to gain unauthorized access to an entity client's account by contacting the client while impersonating the entity's technical support staff. The malicious user may then obtain the client's authentication credentials (e.g., a compromised username and password) and/or request that the client perform an account resource transfer to a different account. In such an embodiment, the events to be identified may be the introduction of a new transferee, a suspicious login from an unknown device and/or location, and a transfer to an unknown account. In this regard, the threat log data may include natural language-based entries such as a voice call from the client with the compromised account, analyst or agent notes or comments, incident reports, or the like.

In the first phase, the system may use an unsupervised learning model to extract common and emerging patterns. In the second phase, the system may use a supervised learning and/or machine learning model to extract a sequence of events. The system may further establish correlations and relationships between both transactional and non-transactional events and patterns. For instance, the system may detect an emerging unauthorized access pattern by integrating and/or correlating client comments (e.g., regarding compromised authentication credentials) with a suspicious login, unauthorized transaction, use of a particular attack vector, or the like. Once the known and emerging threat patterns have been identified, the system may update and/or revise its processes to address the threat (e.g., apply patches, use different encryption standards, or the like).

The system as described herein confers a number of technological advantages over systems which use conventional methods of detecting threat patterns. In particular, by using automated NLP analysis of threat log data, the system may efficiently and effectively increase the security of potentially sensitive data and user accounts hosted on the computing systems within the enterprise environment. Furthermore, through the use of neural networks and/or machine learning models, the system may dynamically adapt to emerging threat patterns over time.

Figure 1:
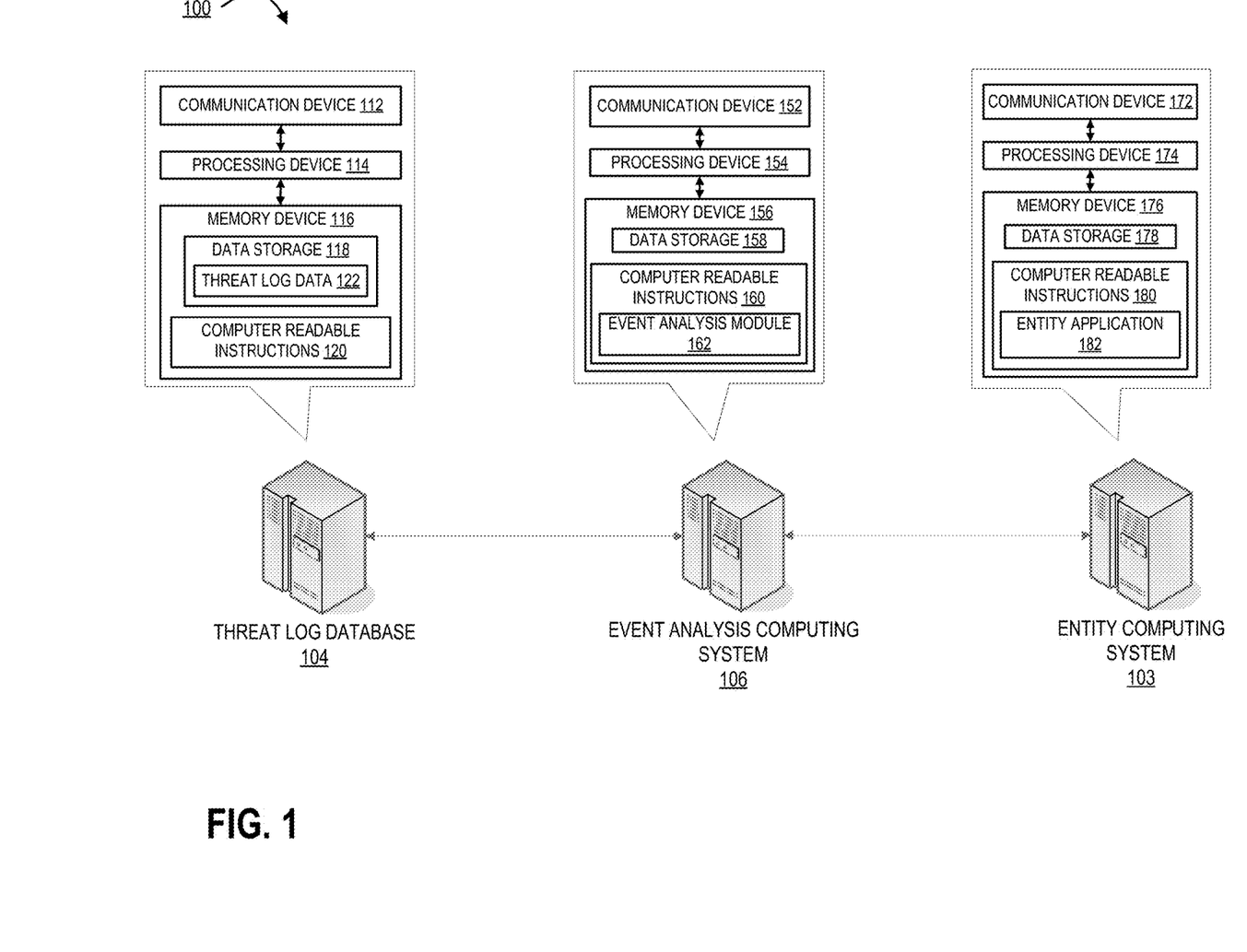
FIG. 1 illustrates an operating environment for the event analysis system, in accordance with one embodiment of the present disclosure.

Turning now to the figures, FIG. 1 illustrates an operating environment 100 for the event analysis system, in accordance with one embodiment of the present disclosure. In particular, FIG. 1 illustrates an event analysis computing system 106 that is operatively coupled, via a network, to a threat log database 104 and/or an entity computing system 103. In such a configuration, the event analysis computing system 106 may transmit information to and receive information from the threat log database 104 and/or the entity computing system 103. It should be understood that FIG. 1 illustrates only an exemplary embodiment of the operating environment 100, and it will be appreciated that one or more functions of the systems, devices, or servers as depicted in FIG. 1 may be combined into a single system, device, or server. For instance, the functions of the event analysis computing system 106 and the threat log database 104 may be executed on a single computing system. Furthermore, a single system, device, or server as depicted in FIG. 1 may represent multiple systems, devices, or servers. For instance, the singular threat log database 104 may represent multiple threat log databases which may host threat log data of various kinds.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the event analysis computing system 106 may comprise a communication device 152, a processing device 154, and a memory device 156. The event analysis computing system 106 may be owned and/or operated by an entity such as an Internet service provider, financial institution, business organization, government agency, or the like. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 154 is operatively coupled to the communication device 152 and the memory device 156. The processing device 154 uses the communication device 152 to communicate with the network and other devices on the network, such as, but not limited to the threat log database 104 and/or the entity computing system 103. The communication device 152 generally comprises a modem, antennae, WiFi or Ethernet adapter, radio transceiver, or other device for communicating with other devices on the network.

The memory device 156 may have computer-readable instructions 160 stored thereon, which in one embodiment includes the computer-readable instructions 160 of an event analysis module 162 which allows the entity system to perform various functions related to data characterization, tracking, management, and other related functions as described herein. In some embodiments, the memory device 156 includes data storage 158 for storing data related to the system environment, but not limited to data created and/or used by the event analysis module 162. The event analysis module 162 may comprise computer-executable program code which may instruct the processing device 154 to perform certain logic, data processing, and data storing functions of the application to accomplish the entity's objectives. For instance, the event analysis module 162 may receive input data and, based on the input data, produce an output with respect to a particular task assigned to the event analysis module 162 (e.g., identification of threat patterns and/or events). The event analysis module 162 may, through training and/or iterative processes (e.g., unsupervised and/or supervised learning), become increasingly effective at accomplishing the given task over a period of time.

As further illustrated in FIG. 1, the threat log database 104 may be a computing system which is owned and/or operated by the entity or third party. In this regard, the threat log database 104 may be, for example, a networked terminal, server, desktop computer, or the like, though it is within the scope of the disclosure for the threat log database 104 to be a portable device such as a cellular phone, smart phone, smart device, personal data assistant (PDA), laptop, or the like. The threat log database 104 generally comprises a communication device 112, a processing device 114, and a memory device 116, where the processing device 114 is operatively coupled to the communication device 112 and the memory device 116. The processing device 114 uses the communication device 112 to communicate with the network and other devices on the network, such as, but not limited to the event analysis computing system 106 and/or the entity computing system 103. As such, the communication device 112 generally comprises a modem, antennae, WiFi or Ethernet adapter, radio transceiver, or other device for communicating with other devices on the network.

The threat log database 104 comprises computer-readable instructions 120 and data storage 118 stored in the memory device 116, which in one embodiment includes the computer-readable instructions 120. The data storage 118 may comprise threat log data 122, where the threat log data 122 may contain various types of threat information. For instance, the threat information may include client communication logs, analyst notes, historical event logs, or the like. In some embodiments, the threat information may be stored in natural language format (e.g., a text file, audio and/or video file, or the like).

The operating environment 100 may further comprise an entity computing system 103. The entity computing system 103 may refer to a computing system which may receive output data from the event analysis computing system 106 and execute one or more processes based on the output data. In some embodiments, the entity computing system 103 may be operated by a user such as an administrator or employee of the entity. Accordingly, the entity computing system 103 may also comprise a processing device 174 operatively coupled to the communication device 172 and a memory device 176 comprising data storage 178 and computer readable instructions 180.

The computer readable instructions 180 may comprise an entity application 182 which may be configured to instruct the processing device 174 to execute certain functions over the network, such as interacting with the event analysis computing system 106, application computing system 105, and/or the threat log database 104. In particular, the entity application 182 receive output data from the event analysis module 162 and update one or more processes according to the output data. For instance, the output data may be threat pattern data extracted from the threat log data (e.g., historical and emerging threat patterns). In such embodiments, the entity computing system 103 may update its processes based on the threat log data (e.g., if the threat pattern involves a particular encryption method, update its processes to use a different encryption method).

The communication device 172, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the entity computing system 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

Figure 2:
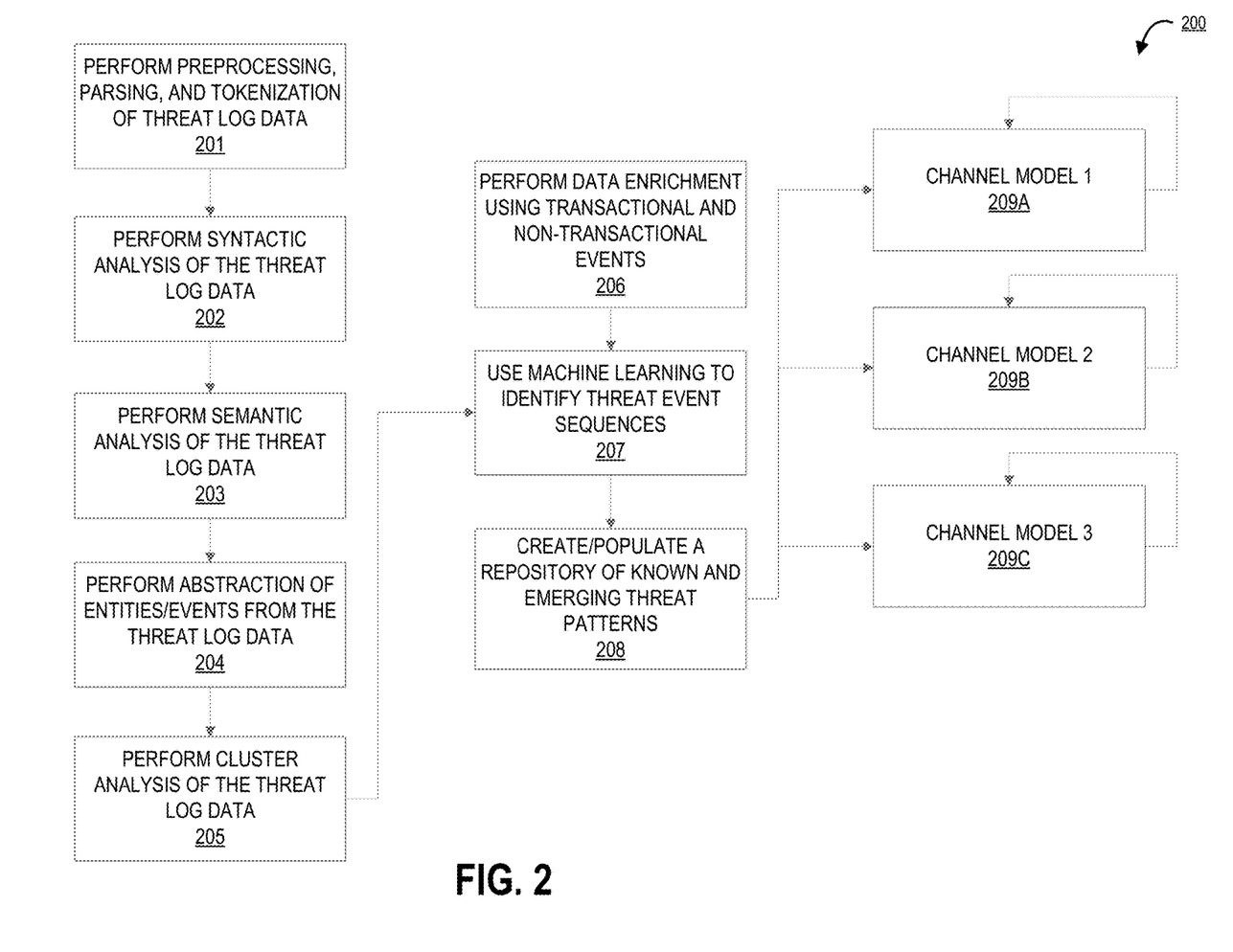
FIG. 2 illustrates a process flow for the event analysis system, in accordance with one embodiment of the present disclosure.

FIG. 2 illustrates a process flow 200 for a configuration process of the machine learning module, in accordance with some embodiments of the present disclosure. The process 200 may begin at block 201, where the system performs preprocessing, parsing, and/or tokenization of threat log data. The system may pull threat log data of various types from various sources. For instance, the system may access threat analyst logs (e.g., natural language logs stored within a database, or the like), client comments/feedback, analyst comments and reports from one or more different channels, third party threat assessments, or the like. Upon accessing the threat log data, the system may perform various types of preprocessing on the threat log data for subsequent analyses via machine learning. For instance, the system may perform parsing of the threat log data (which may include natural language data such as written logs, voice recordings, or the like) to identify the syntactic components of the threat log data. The system may further perform tokenization of the threat log data to assign identifying symbols or units to certain data or sets of data.

The process continues to block 202, where the system performs syntactic analysis of the threat log data. At this stage, the system may identify and classify the threat log data according to the syntactic structures found therein. For instance, the system may identify words, clauses, sentences, particles, or the like based on a specific ruleset (e.g., grammatical ruleset). In some embodiments, the system may build an organized data structure based on the identified syntactic structures (e.g., a syntax tree or the like).

The process continues to block 203, where the system performs semantic analysis of the threat log data. At this stage, the system may establish relationships of syntactic structures to other syntactic structures or concepts relevant to the detection of threat patterns and/or events. For instance, the system may associate certain words or sequence/set of words found in the threat log data (e.g., "unknown login," "suspicious login," "unauthorized access," or the like) with a particular threat event or pattern (e.g., unauthorized login from an unknown device or location).

The process continues to block 204, where the system performs abstraction of entities and/or events from the threat log data. After performing the syntactic and semantic analysis, the system may produce a set of abstracted entities and/or events. For instance, the system may define certain entities (e.g., an authorized user such as an entity client, an unauthorized or malicious user, third parties, or the like) related to threat events (e.g., compromise of a user account, use of the user account for an unauthorized transaction, introduction of a new recipient, or the like).

The process continues to block 205, where the system performs cluster analysis of the threat log data. At this stage, the system may create clusters (e.g., groupings) of the abstracted entities and/or events from the log data according to certain characteristics of the entities and/or events. In some embodiments, the cluster analysis may include performing clustering according to a k-means algorithm or the like. In this way, the system may begin to identify certain emerging patterns or sequences associated with a particular event. For example, the system may identify that a certain portion of account compromise incidents follow a particular pattern (e.g., the unauthorized user poses as a representative of the entity).

In some embodiments, as seen in block 206, the system may perform data enrichment of the threat log data using transactional and non-transactional events. Said data enrichment may include one or more processes to improve the quality of the threat log data such as correction and/or removal of inaccurate, outdated, or incomplete data, reformatting of data, consolidation of duplicate entries (e.g., redundant classifications created during clustering), or the like. In this regard, the system may receive inputs from various other systems within the entity's network and merge the inputs, which may contain transactional and non-transactional event sequences, with the event sequences as determined through NLP. For example, the system may receive transactional information (e.g., a resource transfer of a specified amount to an unknown account) and/or non-transactional information (e.g., changing of contact information or the like).

The process continues to block 207, where the system uses machine learning to identify threat event sequences. Based on the analyses of the threat log data as described above, the system may identify common patterns and learn, over time, which patterns of events are authorized or unauthorized. In some embodiments, the system may use unsupervised learning to extract common and emerging threat patterns. The system may further use supervised learning to extract a sequence of events of various thread patterns. One example of an identified emerging threat pattern and/or event sequence may include the following: an unauthorized user contacts a client user posing as a representative of an entity; the unauthorized user requests the client user's authentication credentials; and the unauthorized user requests that the client user conducts a resource transfer from the client user's account to an account specified by the unauthorized user. To continue the example, the system may further determine additional circumstances in which the unauthorized activity occurs (e.g., the unauthorized user induces compliance through a specific story). By continuously performing the machine learning process, the system may be able to expediently identify not only historical threat patterns but also emerging threat patterns as they occur on an ongoing basis.

The process continues to block 208, where the system creates and/or populates a repository of known and emerging threat patterns. The system may continuously update the repository with detected threat patterns such that the repository contains a complete history of threat patterns as well as up-to-date threat patterns as they are detected from the threat log data.

The process concludes at blocks 209A, 209B, 209C, where the system performs training, retraining, and/or updates to threat detection models across various channels (e.g., Channel 1, Channel 2, Channel 3, or the like). The various channels may represent different methods or channels through which resource transfers are conducted. For instance, Channel 1 may represent transfers conducted through credit cards, while Channel 2 may represent transfers conducted through digital payments, and so on. Accordingly, the repository as described above may be used to train and/or retrain threat detection models (which may use machine learning) using the threat pattern and event information obtained from the threat log data. As the repository is updated with additional pattern information, the threat detection models across the various channels may be updated accordingly. In this way, the system provides an automated, dynamic, and efficient way to obtain threat pattern and event data from threat log data and use the threat pattern and event data to train one or more threat detection models across multiple channels.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for threat detection using integrated natural language processing and event analysis, the system comprising:
   a memory device with executable code stored thereon;
   a communication device;
   a neural network device; and
   a processing device operatively coupled to the memory device and the communication device, wherein the executable code causes the processing device to:
     access, using a natural language processing unit, a set of threat log data;
     perform a series of analyses on the set of threat log data, wherein the series of analyses comprises preprocessing, tokenization, syntactic analysis, and semantic analysis, wherein the set of threat log data comprises a record of access attempts, incident reports, and a record of user interactions received over a first channel comprising a first method for performing resource transfers and a second channel comprising a second method for performing resource transfers;
     based on the series of analyses, identify one or more events and one or more entities;

identify, via machine learning, an event sequence from the one or more events and the one or more entities; and update, using the identified event sequence, a first channel-specific threat detection model and a second channel-specific threat detection model, wherein the first channel-specific threat detection model is configured to analyze the first method for performing resource transfers, wherein the second channel-specific threat detection model is configured to analyze the second method for performing resource transfers.

2. The system according to claim 1, wherein the executable code further causes the processing device to extract, via unsupervised learning, common patterns from the set of threat log data by performing cluster analysis.

3. The system according to claim 1, wherein the set of threat log data comprises voice recordings and written recordings, wherein the executable code further causes the processing device to analyze the voice recordings and the written recordings in parallel.

4. The system according to claim 1, wherein the set of threat log data comprises threat analyst logs, client reports, or third party logs.

5. The system according to claim 1, wherein the executable code further causes the processing device to store the event sequence within a repository of known and emerging patterns.

6. The system according to claim 5, wherein the executable code further causes the processing device to update the one or more channel-specific threat detection models using the repository of known and emerging patterns.

7. The system according to claim 5, wherein identifying the event sequence from the one or more events and the one or more entities comprises using supervised learning to extract a threat pattern from the set of threat log data and the repository of known and emerging patterns.

8. The system according to claim 7, the executable code further causes the processing device to update, using the extracted threat pattern, the one or more channel-specific threat detection models.

9. The system according to claim 1, wherein updating the one or more channel-specific threat detection models comprises training and retraining the channel-specific threat detection models.

10. The system according to claim 1, wherein the executable code further causes the processing device to merge the event sequence with one or more transactional and one or more non-transactional event sequences.

11. A computer-implemented method for threat detection using integrated natural language processing and event analysis, the method comprising:

accessing, using a natural language processing unit, a set of threat log data;

performing a series of analyses on the set of threat log data, wherein the series of analyses comprises preprocessing, tokenization, syntactic analysis, and semantic analysis, wherein the set of threat log data comprises a record of access attempts, incident reports, and a record of user interactions received over a first channel comprising a first method for performing resource transfers and a second channel comprising a second method for performing resource transfers;

based on the series of analyses, identifying one or more events and one or more entities;

identifying, via machine learning, an event sequence from the one or more events and the one or more entities; and updating, using the identified event sequence, a first channel-specific threat detection model and a second channel-specific threat detection model, wherein the first channel-specific threat detection model is configured to analyze the first method for performing resource transfers, wherein the second channel-specific threat detection model is configured to analyze the second method for performing resource transfers.

12. The computer-implemented method of claim 11, the method further comprising extracting, via unsupervised learning, common patterns from the set of threat log data by performing cluster analysis.

13. The computer-implemented method of claim 11, wherein the set of threat log data comprises voice recordings and written recordings, the method further comprising analyzing the voice recordings and the written recordings in parallel.

14. The computer-implemented method of claim 11, wherein the set of threat log data comprises threat analyst logs, client reports, or third party logs.

15. The computer-implemented method of claim 11, the method further comprising storing the event sequence within a repository of known and emerging patterns.

16. The computer-implemented method of claim 15, the method further comprising updating the one or more channel-specific threat detection models using the repository of known and emerging patterns.

17. The computer-implemented method of claim 15, wherein identifying the event sequence from the one or more events and the one or more entities comprises using supervised learning to extract a threat pattern from the set of threat log data and the repository of known and emerging patterns.

18. The computer-implemented method of claim 17, the method further comprising updating, using the extracted threat pattern, the one or more channel-specific threat detection models.

19. The computer-implemented method of claim 11, wherein updating the one or more channel-specific threat detection models comprises training and retraining the channel-specific threat detection models.

20. An integrated natural language processing unit for threat detection using event analysis, the unit comprising:

a memory device with executable code stored thereon;
a communication device;
a neural network device; and
a processing device operatively coupled to the memory device and the communication device, wherein the executable code causes the processing device to:
access a set of threat log data;
perform a series of analyses on the set of threat log data, wherein the series of analyses comprises preprocessing, tokenization, syntactic analysis, and semantic analysis, wherein the set of threat log data comprises a record of access attempts, incident reports, and a record of user interactions received over a first channel comprising a first method for performing resource transfers and a second channel comprising a second method for performing resource transfers;
based on the series of analyses, identify one or more events and one or more entities;
identify, via machine learning, an event sequence from the one or more events and the one or more entities; and
update, using the identified event sequence, a first channel-specific threat detection model and a second channel-specific threat detection model, wherein the first channel-specific threat detection model is configured to analyze the first method for performing resource transfers, wherein the second channel-specific threat detection model is configured to analyze the second method for performing resource transfers.

\* \* \* \* \*